United States Patent [19]
Nürnberg et al.

[11] 3,714,483
[45] Jan. 30, 1973

[54] SHIELD FOR ELECTRICAL MACHINES

[75] Inventors: Werner Nürnberg; Rolf Hanitsch, both of Berlin, Germany

[73] Assignee: Licentia Patent-Verwaltungs-GmbH, Frankfurt am Main, Germany

[22] Filed: June 2, 1971

[21] Appl. No.: 149,139

[30] Foreign Application Priority Data

June 3, 1970 Germany..................P 20 28 288.6
June 3, 1970 Germany..................P 70 21 582.6

[52] U.S. Cl................................................310/256
[51] Int. Cl..............................................H02k 1/12
[58] Field of Search........310/256, 182, 183, 190, 93, 310/193

[56] References Cited

UNITED STATES PATENTS 3,114,063   12/1963   Karsten...............................310/256
2,906,899   9/1959   Geneslay..............................310/93

Primary Examiner—D. F. Duggan
Attorney—Spencer & Kaye

[57] ABSTRACT

An electrical machine with iron parts has a sheet-metal magnetic shield for shielding the iron parts against stray fields. The shield has a layer arranged substantially parallel with respect to a surface of the iron parts. This layer has a first partial layer of sheets disposed adjacent the surface and constructed from a nonmagnetic material having high electrical conductivity, and a second partial layer of sheets constructed from a material having a high relative permeability.

6 Claims, 1 Drawing Figure

PATENTED JAN 30 1973 3,714,483
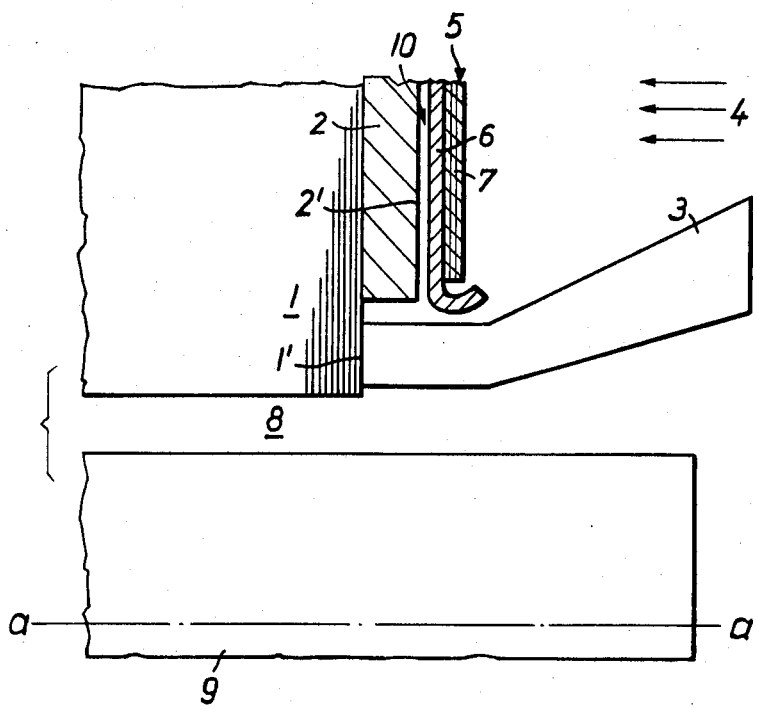
Inventors.
Werner Nürnberg
Rolf Hanitsch
BY *Spencer & Kays*
ATTORNEYS.

SHIELD FOR ELECTRICAL MACHINES

BACKGROUND OF THE INVENTION

The present invention relates to a sheet-metal magnetic shield for shielding iron parts of electrical machines against stray fields.

The stray fields in electrical machines considerably contribute to the additional losses in the machines. In order to keep these losses low, it is necessary to shield the stray fields, particularly the frontal stray fields occurring in the area of the coil winding ends, from the adjacent iron parts.

It is known to provide shielding against stray fields in the form of individually laminated elements of a magnetic material which are distributed on the periphery of the stator coil winding ends. The lamination must be so provided that the stray field lines in these elements are offered a path in a material which has a high relative permeability, but also a high electrical resistance transverse to the path for the induced electromotive forces. This arrangement cannot be successful for the reason that in, for example, poly-phase a.c. machines, the frontal stray field has a rotating field characteristic. It has therefore been proposed to dispose shielding rings above the stator coil winding end. These rings are packets of coaxial rings constructed from thin metal sheets. This arrangement tries to place the narrow side of the individual sheets against the stray field lines so that eddy currents cannot be induced in the metal. Since, however, the stray field does not extend only coaxially in the frontal area, it was believed that this arrangement could be improved by placing laminated packets in the individual stray field areas. The narrow metal sides of these packets were arranged to follow the preferred direction of the stray field lines. It has been found, however, that this also could not produce a substantial reduction of the losses caused by the frontal stray field.

A pressure plate of insulating material for the stator lamination packets of AC machines has also been provided as a damping shield for the stray field. Metallic inserts are provided in this pressure plate which are constructed of either only nonmagnetic material having a high electrical conductivity, such as copper, brass, and the like, or only of material having a high relative permeability, such as superimposed windings of tape-type metal materials. This arrangement, however, also produces losses due to the frontal stray field which are too high to meet the requirements for sufficient shielding.

It has been found that with increasing thickness of the metal shielding packet — and, thus, increasing shielding effects—the losses increase correspondingly. In particular, these losses are strong with shielding material which has high electrical conductivity.

SUMMARY OF THE INVENTION

It is an object of the present invention to provide a magnetically effective stray-field shielding whose losses are much less than in the known arrangements.

This and other objects are accomplished according to the present invention by providing a layer arranged substantially parallel to the surface of the iron parts to be shielded. This layer has a partial layer of metal sheets disposed adjacent the surface of the iron parts and constructed from a nonmagnetic material having high electrical conductivity, and a partial layer of metal sheets constructed from a material having a high relative permeability.

It has been found contrary to expected results, that with such a metal combination, the stray fields are sufficiently shielded and losses due to the stray fields can be kept relatively low.

As used in this specification and claims, relative permeability refers to the property of a magnetizable substance that determines the degree in which the magnetizable substance modifies the magnetic flux in the region occupied by the magnetizable substance when arranged in a magnetic field.

BRIEF DESCRIPTION OF THE DRAWING

The sole FIGURE is a schematic, side elevational view, partly in cross section, of a portion of an electrical machine provided with a shield according to the present invention.

DESCRIPTION OF THE PREFERRED EMBODIMENTS

The FIGURE shows a portion of an electrical machine — for example, a polyphase AC electric generator - having a conventional stator lamination packet 1 compressed by a pressure plate 2. A coil winding end 3 of a coil winding is mounted on stator lamination packet 1 and extends in a direction away from the surface 1' of stator lamination packet 1 and surface 2' of pressure plate 2. It is to be understood that in an actual generator there would be several coil windings each with a coil winding end 3. Coil winding end 3 has electrical conductors (not shown) which create in a known manner a stray field indicated by arrows 4. Stator lamination packet 1 and pressure plate 2 are shielded from the stray field indicated by arrows 4 by a shield having a layer 5 arranged substantially parallel with respect to surfaces 1' and 2'.

A suitable, known rotor 9 is arranged with respect to the stator to define an air gap 8. The mounting of rotor 9 with respect to the stator having stator lamination packet 1, pressure plate 2, and coil winding end 3 is conventional, and any suitable, known type of construction will be satisfactory. In the embodiment shown in the FIGURE, rotor 9 rotates about, for example, axis a—a. A conventional type of the construction of a laminated end-shield for a generator similar to the above mentioned is described and shown, e.g., in the U.S. Pat. No. 2,795,714 (Baudry).

Layer 5 has a first partial layer 6 of metal sheets disposed adjacent and parallel to surface 2' of pressure plate 2, and is constructed from a nonmagnetic material having high electrical conductivity. Examples of suitable materials are metals, such as, copper, brass, and aluminum. Although partial layer 6 is shown as a single metal sheet, it is understood that partial layer 6 may be made up of a plurality of sheets if desired. To prevent a magnetic flux from extending in undesired directions, a portion of said partial layer 6 adjacent coil winding end 3 extends away from surface 2' substantially in the direction of extension of coil winding end 3.

A second partial layer 7 of layer 5 is made up of, as shown in the FIGURE, a plurality of sheets constructed from a material having a high relative permeability. A suitable material is, for example, a metal such as conventional dynamo steel. The properties of such steel are set out in detail in, for example, "The Making, Shaping and Treating of Steel", U.S. Steel Corporation, Pittsburgh, Pa., 1957, pages 848 to 852. The exact thickness of each partial layer 6, 7 and of layer 5 is a function of the particular application of the shield.

Partial layers 6 and 7 may be attached to one another in any suitable, known manner. For example, they may be bonded to one another by a suitable, known adhesive, such as a rubber or thermoplastic cement, by welding, or by suitable, known fasteners, such as screw fasteners and clamps. The layer 5 may be mounted in a known manner (not shown) in a generator housing (not shown) and slightly spaced from surface 2' to provide an air gap 10.

For a 400 MVA, 20 kV, two-pole alternating-current turbine generator, e.g., the partial layer 6 consisting of one or more sheets of copper should have a total thickness of 1.5 cm, and the partial layer 7 consisting of sheets of conventional dynamo steel should suitably have a total thickness of 4 cm. The air gap 10 is due to the cooling system of the generator. There should be provided an air gap 10 of 1 cm, if a hydrogen atmosphere of a pressure of 4 atmospheres is used.

It will be understood that the above description of the present invention is susceptible to various modifications, changes and adaptations, and the same are intended to be comprehended within the meaning and range of equivalents of the appended claims.

We claim:

1. In an electrical machine having rotor means and stator means including iron parts defining a surface, the improvement comprising a radially extending sheet-metal magnetic shield for shielding said iron parts against stray fields and having a layer arranged substantially parallel with respect to said surface; said layer having a first partial layer of at least one sheet disposed adjacent said surface and constructed from a nonmagnetic material having high electrical conductivity and a second partial layer of sheets constructed from a material having a high relative permeability, said second partial layer being axially disposed with respect to said first partial layer and said first partial layer substantially completely radially overlying said second partial layer.

2. An electrical machine as defined in claim 1, wherein the sheets of the partial layers are metal sheets.

3. An electrical machine as defined in claim 2, wherein said iron parts form part of said stator means and are a stator lamination packet and a pressure plate for compressing said stator lamination packet, and further including a coil winding end mounted on said stator lamination packet and extending in a direction away from said said surface and creating a stray field.

4. An electrical machine as defined in claim 3, wherein a portion of said first partial layer adjacent said coil end winding extends away from said surface substantially in the direction of extension of said coil winding end.

5. An electrical machine as defined in claim 3, wherein the metal sheets of said first partial layer are constructed from a metal selected from the group consisting of copper, brass, and aluminum, and the metal sheets of said second partial layer are constructed from an intermediate-silicon steel.

6. An electrical machine as defined in claim 1 wherein an air gap is provided between said surface and said sheet-metal magnetic shield.

* * * * *